United States Patent [19]
Ishizuka et al.

[11] Patent Number: 5,930,066
[45] Date of Patent: Jul. 27, 1999

[54] INFORMATION RECORDING APPARATUS

[75] Inventors: Kou Ishizuka, Omiya; Hidejiro Kadowaki, Yokohama; Naoki Kawamata; Hiroyuki Hagiwara, both of Utsunomiya; Jun Ashiwa, Yokohama, all of Japan

[73] Assignee: Canon Kabushiki Kaisha, Tokyo, Japan

[21] Appl. No.: 08/917,696

[22] Filed: Aug. 26, 1997

[30]     Foreign Application Priority Data

Aug. 30, 1996   [JP]   Japan .................................. 8-248802

[51] Int. Cl.⁶ .............................. G11B 5/596; G11B 7/00
[52] U.S. Cl. ..................................... 360/77.03; 360/77.02; 369/103
[58] Field of Search .............................. 360/77.03, 77.02, 360/77.01, 76, 75, 103, 109, 137, 69; 369/44.28, 44.11, 44.14, 44.17, 103, 109, 112

[56]                References Cited

U.S. PATENT DOCUMENTS

| | | | |
|---|---|---|---|
| 4,866,553 | 9/1989 | Kubo et al. ............................. | 360/103 |
| 5,067,813 | 11/1991 | Ishizuka et al. ........................ | 356/351 |
| 5,319,509 | 6/1994 | Michelson et al. .............. | 360/77.03 X |
| 5,471,304 | 11/1995 | Wang ................................. | 360/77.03 X |
| 5,534,693 | 7/1996 | Kondo et al. ........................... | 250/237 |
| 5,568,337 | 10/1996 | Eguchi et al. ........................ | 360/78.11 |

*Primary Examiner*—Muhammad Edun
*Attorney, Agent, or Firm*—Fitzpatrick, Cella, Harper & Scinto

[57]                ABSTRACT

An apparatus records information on a hard disk with a magnetic head arm provided in a hard disk drive. The apparatus comprises an interference measuring system, containing an outgoing portion for a measuring light beam to the arm and a reference light forming portion, for obtaining relative displacement information with respect to the arm by interfering the reference light with reflected light of the measuring light from the arm or a slider belonging to the arm, the interference measuring system having a light beam deflecting member for deflecting the measuring light and thus guiding the measuring light to a lateral surface of the arm or of the slider, a control system for generating a signal for positioning the arm with respect to the hard disk on the basis of the relative displacement information obtained by the interference measuring system, and a signal system for transmitting a signal for recording information on the hard disk to the magnetic head.

12 Claims, 9 Drawing Sheets

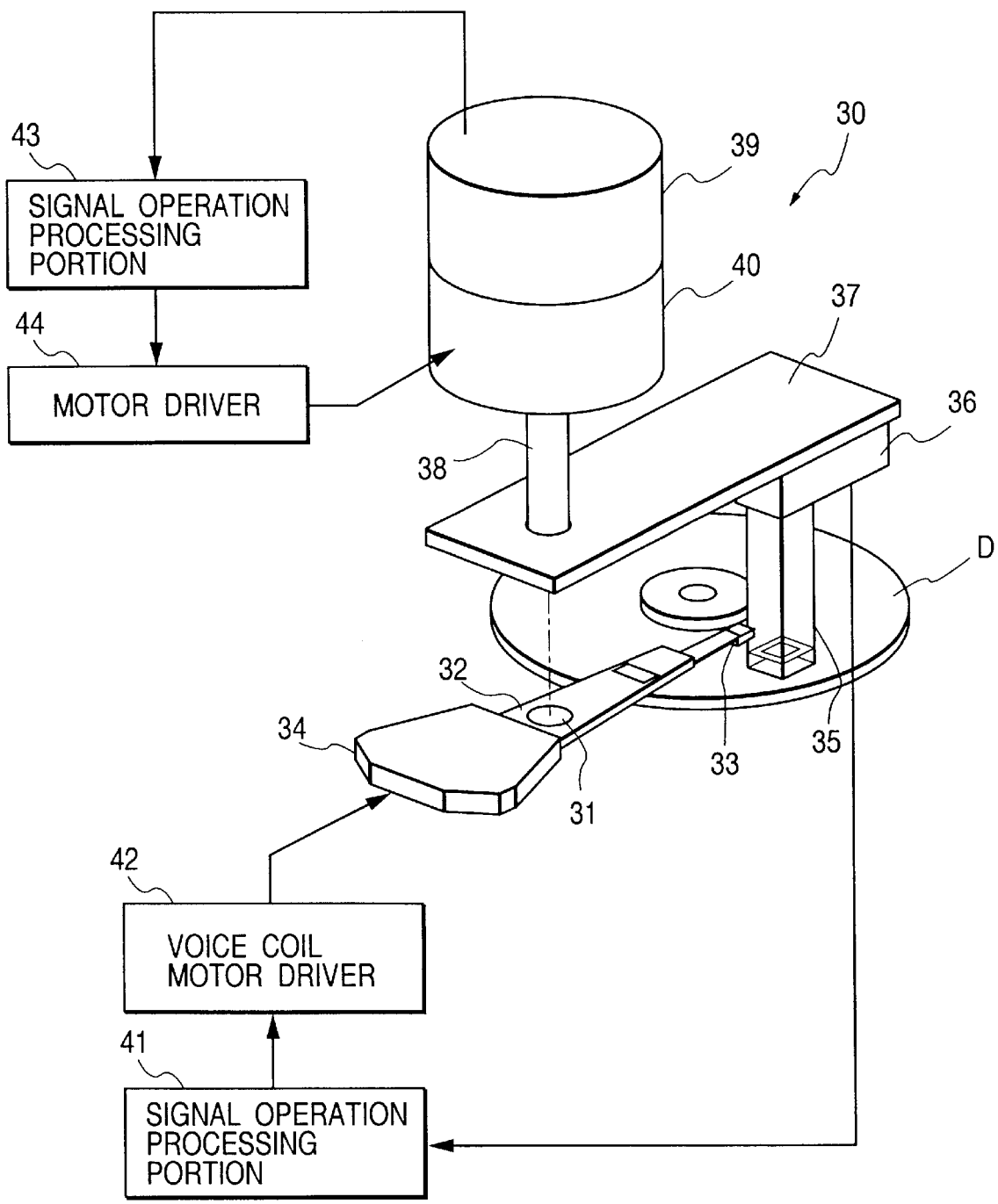

INFORMATION RECORDING APPARATUS

BACKGROUND OF THE INVENTION

1. Field of the Invention

The present invention relates to an information recording apparatus for recording information onto the hard disk of a hard disk drive, etc., used for a computer.

2. Related Background Art

FIG. 1A is a plan view showing a conventional hard disk drive 1, wherein a hard disk D with its surface onto which a magnetic recording medium is vapor-deposited is always rotated about a spindle 2 at a high speed. An unillustrated magnetic head incorporated into a slider 3 taking a substantially rectangular Parallelepiped shape is disposed in close proximity to the surface of the hard disk D. The slider 3 is secured to a tip of a magnetic head arm 5 having a center-of-rotation 4 outside the hard disk D. A voice coil 6 is fixed to a proximal end of the magnetic head arm 5.

In this construction, the magnetic head relatively moves in a substantially radial direction on the hard disk D and makes a circular-arc movement in combination with the rotating hard disk D. The magnetic head is thus capable of writing magnetic information on a track in an arbitrary position on the surface of the hard disk D assuming a disc-like configuration and reading the magnetic information from the track at the arbitrary position.

The hard disk D is divided into a plurality of circular tracks each having a different radius, which are defined as circles concentric to the center-of-rotation 4, and each track is also segmented into a plurality of circular arcs. Recording and reproducing processes are executed in time-series in the peripheral direction with respect to the plurality of finally segmented circular arc areas, thus effecting magnetic recording on the hard disk D.

In recent years, a recording capacity of the hard disk D and a density of recording information have been required to increase. To meet those requirements, there is a necessity for enhancing the recording density in the radial direction by narrowing track widths on the concentrically, circularly divided hard disk D. The recording density in the radial direction is expressed in a track density T/I (track/inch) and is presently on the order of 8000 T/I, which indicates that a track interval is approximately 3.125 $\mu$m.

A process of seeking out such a minute track pitch involves positioning a slider 3 as a magnetic head by 0.06 $\mu$m in the radial direction on the hard disk D, which value is defined as a resolution on the order of ⅟₅₀ of the track width, and writing a servo track signal in advance. For this purpose, the servo track signals must be sequentially written while executing a high-resolution positioning process for a short period of time.

FIG. 1B is a perspective view showing a hard disk drive 1 for writing the servo track signal by use of a push rod 7. A cylindrical surface of the push rod 7 is kept in contact with a lateral surface of a magnetic head arm 5, and the push rod 7 is attached to an arm 9 including a rotary shaft 8 coaxial with the center-of-rotation 4. Then, a rotary positioner or the like consisting of a rotary encoder 10 and a drive motor 11 is fixed to the rotary shaft 8. An output of the rotary encoder 10 sequentially is connected to a signal operation processing portion 12, a motor driver 13 and a drive motor 11.

The positioning process is implemented by sequentially minutely moving the push rod 7 while pushing the magnetic head arm 5 against the cylindrical surface of the push rod 7 in the horizontal direction, thus writing the servo track signals in sequence. The push rod 7 is capable of performing the positioning process and the minute movement with a resolution and precision as high as 0.01 $\mu$m or under by use of the rotary positioner.

In contrast with this, there has been recently devised a system for executing the minute movement in a non-contact manner for correspondence to high-density recording. FIG. 1C is a perspective view showing a hard disk drive of a non-contact interference distance measuring system. A retroreflector 14 like a corner cube is placed on a magnetic head arm 5. A beam splitter 15 and a laser light source 16 are arranged on the optical axis of a light beam L1 irradiating this retroreflector 14. A fixed mirror 17 for reflecting a light beam L2 is disposed on one side in a reflecting direction of the beam splitter 15, while, on the other side, a light receiving element 18 for receiving the light beam L2 is disposed. Then, an output of the light receiving element 18 is connected to a voice coil 6 via a signal operation processing portion 19 and a voice coil motor driver 20.

A laser beam emitted from the laser light source 16 is split into two light beams L1, L2 by the beam splitter 15. The light beam L1 is reflected by the retroreflector 14, and the light beam L2 is reflected by the fixed mirror 17. Both of the light beams L1, L2 reach the beam splitter 15, and overlapped interference light beams are received by the light receiving element 18. A signal thereof is arithmetically processed in the signal operation processing portion 19, thereby measuring a position of the magnetic head arm 5 at a high precision. Based on this piece of data, the voice coil motor driver 20 flows an electric current through the voice coil 6 to directly move the magnetic head arm 5. Thus, a high-precision positioning process is implemented in a non-contact manner by carrying out the proper control.

In the non-contact high-precision positioning system based on the principle of a laser interference distance measurement in which a movement of the magnetic hard arm 5 is measured by an optical means without mechanically pushing the magnetic head arm 5, there might be a necessity for placing the corner cube for sticking the retroreflector 14 defined as an optical index onto the magnetic head arm 5, and a problem lies in securing a space and in a variation in gap between the slider 3 and the hard disk D due to an increase in weight.

Further, it also can be devised that the distance to the lateral surface of the slider 3 is directly optically measured by adding nothing to the magnetic head arm 5. However, if the light beam for measurement comes in and out from outside in parallel to the hard disk D, some contrivances are required, wherein a lateral surface of the hard disk drive 1 is normally formed with a window for transmitting the light beam, or a lay-out is made so as not to intercept the light beams with electronic parts, etc. Accordingly, it can be devised that the light beam falls substantially in a direction of an upper surface of the hard disk D by deflecting the light beam by 90 degrees, using a small mirror and a prism.

The slide 3 is, however, approximately 300 $\mu$m in thickness, and a gap from the surface of the hard disk D is approximately 1 $\mu$m. Therefore, in a simple 45-degrees mirror or 45-degrees deflection prism having an angle of several millimeters, the light beam is required to come in and out in the vicinity of a front edge of the mirror, and the prism must be manufactured with an allowance because of an acute angle of the mirror edge. Further, there might be a possibility in which the mirror edge impinges upon the surface of the hard disk D. Moreover, the lateral surface of the slider 3 has just a rectangular area as minute as 1000×

300 μm, and hence, there arises such a problem that a sectional configuration of the illumination light must be formed in a small rectangular or elongate elliptical shape corresponding thereto in order to effectively obtain the reflected light.

SUMMARY OF THE INVENTION

It is a primary object of the present invention, which was devised to obviate the problems given above, to provide an information recording apparatus capable of stably easily writing a servo track signal with a high density by optically executing a positioning process at a high precision.

Other objects of the present invention will become obvious during the discussions of the embodiments which follow.

BRIEF DESCRIPTION OF THE DRAWINGS

FIG. 2A is a perspective view showing a hard disk drive in a first embodiment;

DESCRIPTION OF THE PREFERRED EMBODIMENTS

Figure 1A:
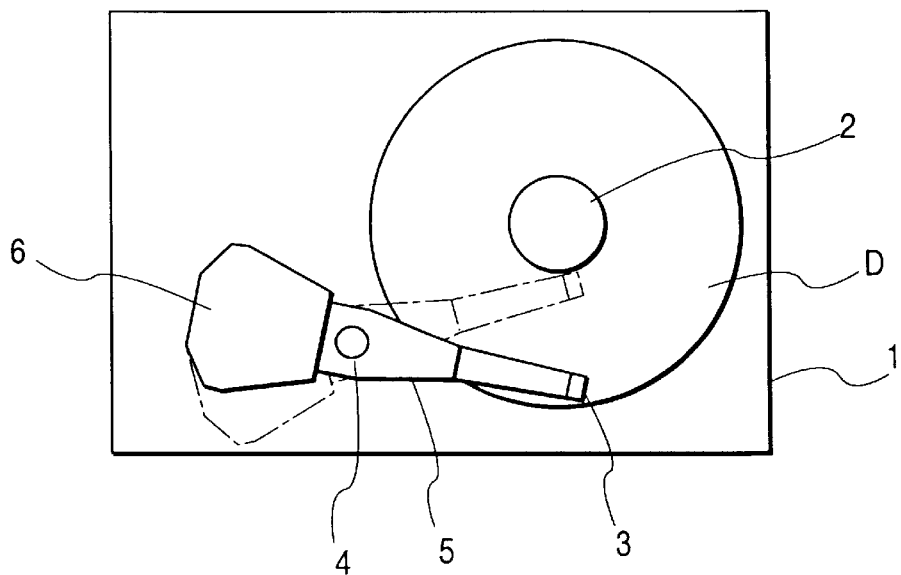
FIG. 1A is a plan view of a hard disk drive in the conventional art.
Figure 1B:
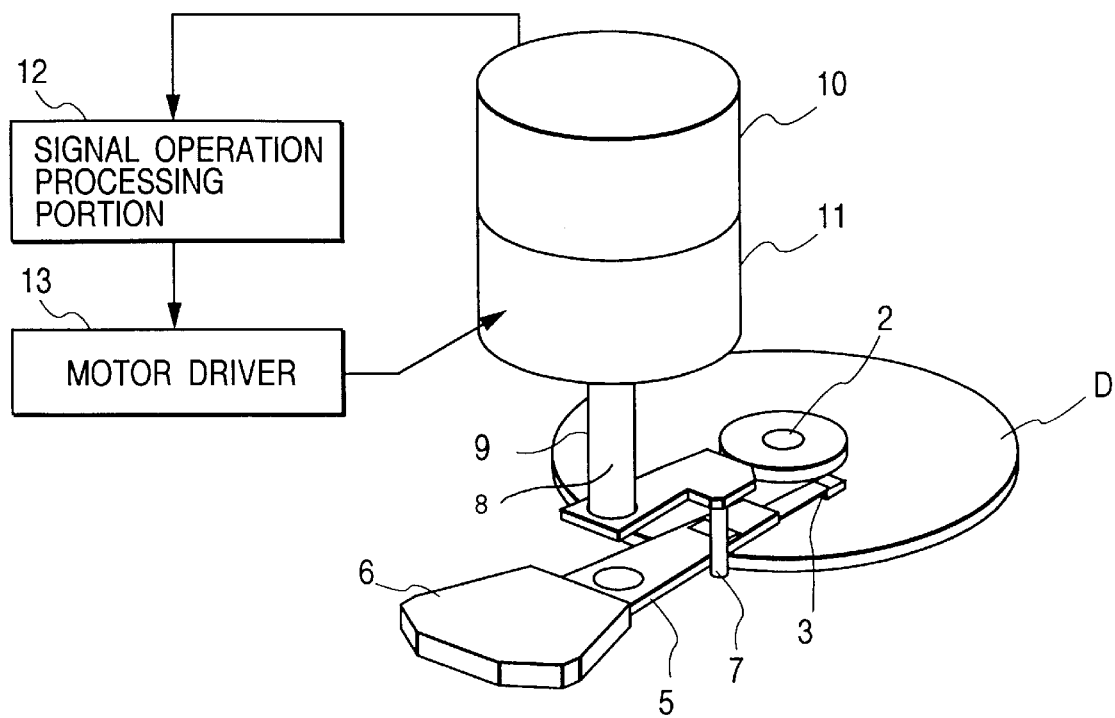
FIG. 1B is a perspective view showing a push rod type hard disk drive.
Figure 1C:
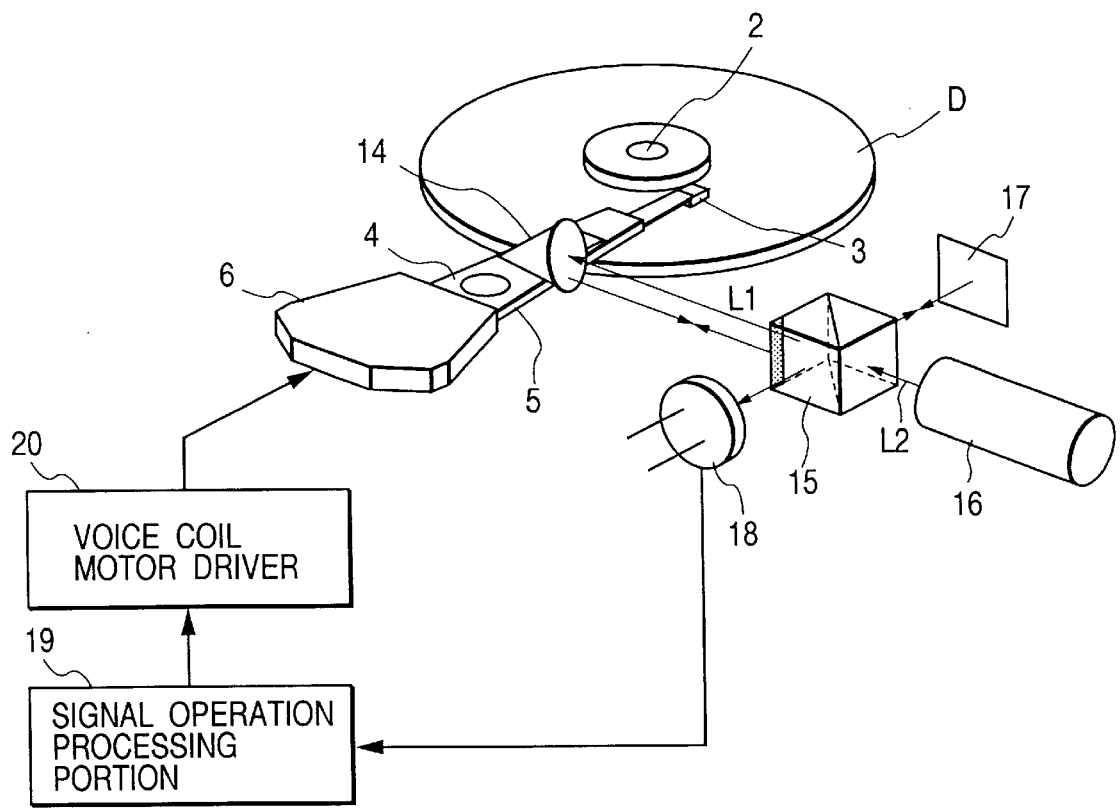
FIG. 1C is a perspective view of a hard disk drive of a non-contact interference distance measuring type.

The present invention will hereinafter be described in greater detail by way of illustrative embodiments with reference to FIGS. 2A and 2B and FIGS. 3 to 9.

FIG. 2A is a perspective view showing a first embodiment, wherein a hard disk drive 30 includes a magnetic head arm 32 secured thereto and having a center-of-rotation 31 outside a hard disk D, and also a slider 33 disposed at the tip of the arm 32 at an interval of several μm or under in a face-to-face relationship with the surface on the hard disk D. The slider 33 is fitted with an unillustrated magnetic head by which information can be recorded onto the hard disk D. A voice coil 34 is fixed to a proximal end of the magnetic head arm 32, and, upon flowing an electric current across the voice coil 34, the magnetic head arm 32 rotates, with the result that the slider 33 moves in a circular arc.

An optical non-contact distance sensor unit 36 having an optical probe 35 is disposed in a space above an upper surface of the hard disk drive 30. This optical non-contact distance sensor unit 36 is attached to an arm 37. The arm 37 is supported on a rotary shaft 38 coaxial with the center-of-rotation 31 of the magnetic head arm 32. Then, a rotary positioner consisting of a high-resolution rotary encoder 39 and a drive motor 40, is connected to the rotary shaft 38. The optical non-contact distance sensor unit 36 is driven and rotated about the rotary shaft 38 by the drive motor 40, and a rotary position thereof is measured by the rotary encoder 39, thereby enabling the control for executing a high-precision rotary positioning process.

An output of the optical non-contact distance sensor unit 36 is connected sequentially to a signal operation processing portion 41, a voice coil motor driver 42 and the voice coil 34, while an output of the rotary encoder 39 is sequentially connected to a signal operation processing unit 43, a motor driver 44 and the drive motor 40.

Figure 2B:
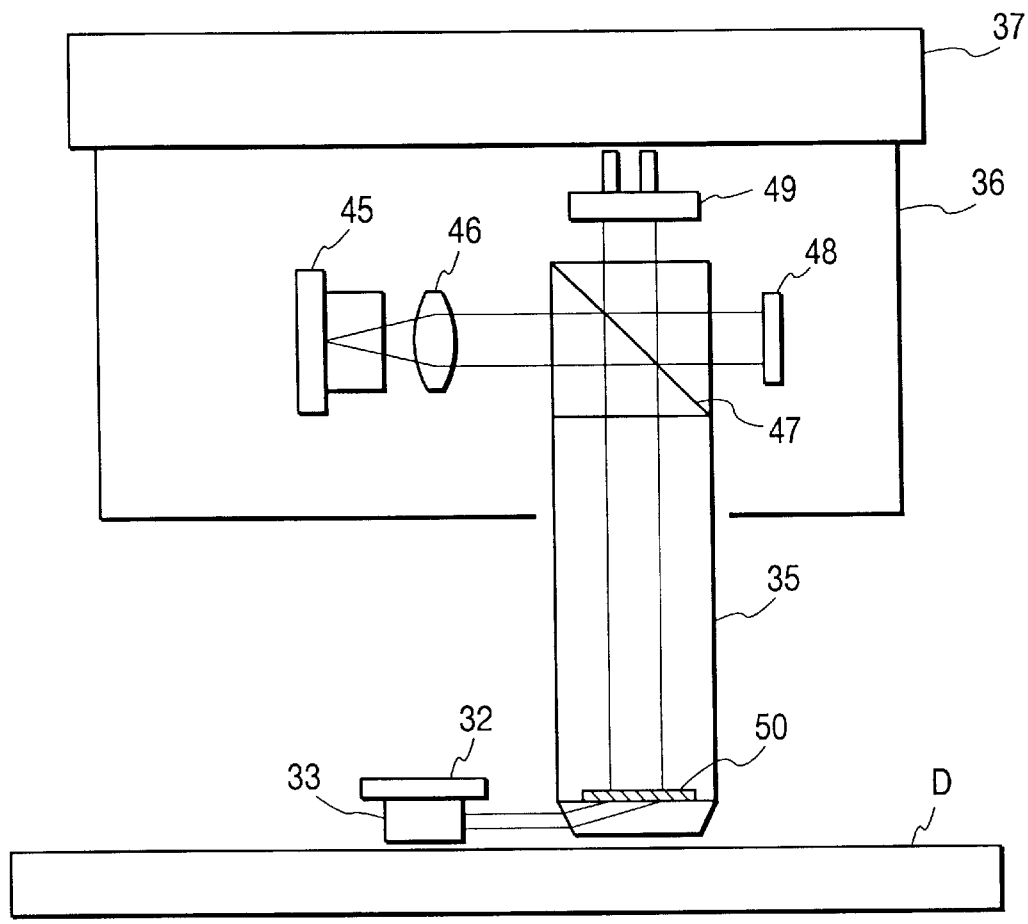
FIG. 2B is a view showing a construction of an optical non-contact distance sensor unit.
Figure 3:
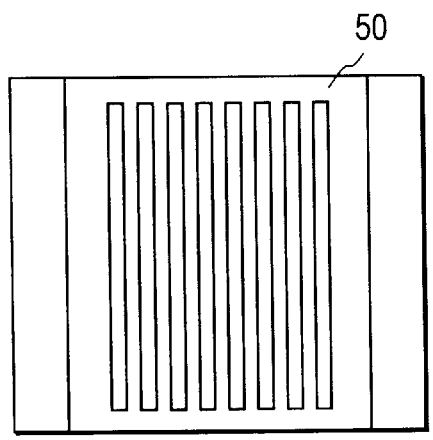
FIG. 3 is a plan view of a diffraction grating.

FIG. 2B is a view showing a construction of the optical non-contact distance sensor unit 36. The optical non-contact distance sensor unit 36 is constructed of an interference distance measuring unit consisting of a coherent light source 45 such as a laser diode, a collimator lens 46, a prism-like beam splitter 47, a mirror 48 and a light receiving element 49, a diffraction grating 50 shown in FIG. 3, and the optical probe 35 formed of a refracting surface shown in FIG. 2B.

The optical non-contact distance sensor unit 36 emits light beams substantially parallel to the hard disk D via the optical probe 35 having the built-in diffraction grating 50, and illuminates a lateral surface of the magnetic head arm 32 or of the slider 33 with the light beams. The light beams reflected therefrom travel back to the optical non-contact distance sensor unit 36, and are detected by the light receiving element 49 provided inside, whereby a distance between the optical non-contact distance sensor unit 36 and the magnetic head arm 32 or the slider 33 can be measured with a resolution on the order of 0.01 μm or under.

Owing to the above-described construction of the apparatus, when executing a minute positioning process in a non-contact manner, to start with, the optical non-contact distance sensor unit 36 is rotationally moved by a minute angle by use of the outside drive motor 40 and rotary encoder 39. A rotary shaft is connected to the drive motor 40 and the rotary encoder 39, and a signal of the rotary encoder 39 is inputted to the signal operation processing portion 43, thereby executing the high-precision rotary positioning process using the drive motor 40 through the motor driver 44. Then, the optical non-contact distance sensor unit 36 outputs a signal indicating that the distance to the magnetic head arm 32 or the slider 33 is changed.

Next, when the magnetic head arm 32 is rotated by flowing the current through the voice coil 34, the optical non-contact distance sensor unit 36 outputs a signal indicating that the distance is again changed, and this signal is inputted to the signal operation processing portion 41. Then, the magnetic head arm 32 is driven by the voice coil motor driver 42 via the voice coil 34. The distance therebetween reverts to the original state just when judging that the magnetic head arm 32 becomes an initial state. With a repetition of those operations at a high velocity, the magnetic head arm 32 or the slider 33 can be minutely moved and positioned at the high precision in the non-contact manner interlocking with the minute movement and the high-precision positioning process of the optical probe 35 of the optical non-contact distance sensor unit 36. Note that the procedures for the actual positioning process are not necessarily intermittently conducted as described above, however, the positioning process may be executed based on an optimal control theory by moving the magnetic head arm 32 so as to follow up the movement of the optical non-contact distance sensor unit 36 at a spatial interval.

Divergent beams of light from the coherent light source 45 are substantially collimated by the collimator lens 46 and split into transmitting light beams and reflecting light beams by the beam splitter 47. The substantially parallel beams of light reflected by the beam splitter 47 pass through inside the optical probe 35 and travel toward the surface of the hard disk D. The parallel light beams are then incident upon the diffraction grating 50 having a grating pitch slightly longer than a wavelength λ (μm) within a material of the coherent light source 45, and deflected in an optical path thereof by an angle of substantially 90 degrees by the diffraction, thus traveling in the crosswise direction. The light beams are then refracted by an obliquely cut-off tapered surface at an outgoing end of the optical probe 35, and travel in the space approximately 200 μm above from the surface of the hard disk D as well as being completely parallel to the surface of the hard disk D. These light beams illuminate the lateral surface of the slider 33 existing in the space above the hard disk D. The light beams reflected by the lateral surface of the slider 33 then travel back to the beam splitter 47 via the previous optical path.

On the other hand, the light beams transmitting through the beam splitter 47 are reflected by the fixed mirror 48 and thus return to the beam splitter 47. Then, the two light beams are synthesized into one beam of interference light beams in the beam splitter 47. If the distance to the side surface of the slider 33 is being changed, a brightness of the interference light beams changes every time a difference in length between the reciprocative optical paths for the two light beams split by the beam splitter 47 becomes a multiple of an integer of the wavelength of the coherent light source 45. More specifically, when the coherent light source involves the issue of a semiconductor laser having a wavelength on the order of 0.78 μm, and if the distance to the lateral surface of the slider 33 deviates by 0.39 μm, the brightness varies by one period in a sinusoidal waveform. This variation in the brightness is converted into an electric signal by the light receiving element 49.

Accordingly, if previously set to such a distance as to have an intermediate brightness, a level of the electric signal changes most sensitively just when the distance to the lateral surface of the slider 33 is changed, and hence, the device is optimal as an interference type distance sensor. The change in the level of this electric signal assuming the sinusoidal waveform can be detected with a resolution on the order of 0.01 μm by use of a known electric circuit having a resolution capable of dividing one sine wave of 0.39 μm into several tens of phases, and the variation in the distance to the lateral surface of the slider 33 can be obtained.

Thus, a position of the slider 33 is measured directly with the high resolution in the non-contact manner by making use of the light interference principle, and the slider 33 can be thus positioned. Therefore, a servo track signal can be written onto the hard disk D with a high stability at every stop during execution of an intermittent repetitive high-precision positioning process.

Further, the light beams for measuring the position of the slider 33 are guided by the optical probe 35 from the direction upward of the hard disk D and irradiate the lateral surface of the slider 33. Thereafter, the light beams are again guided by the optical probe 35 and travel in the direction upward of the hard disk D. With this structure, as in the case of utilizing a push rod in the conventional art, an upper surface of the hard disk drive 30 is formed with a circular-arc window into which the optical probe 35 is inserted, thereby enabling the servo track signal to be written. Therefore, no special structure may be added to the hard disk drive 30, and there is no constraint in terms of disposing the electronic board in order not to intercept the light beams.

Moreover, the light beams are deflected in the optical path by the angle of substantially 90 degrees by the diffraction grating 50, and it is therefore possible to shape the light beams assuming the circular shape or square shape in section down into light beams taking an elongate elliptical shape or rectangular shape in section, thereby increasing light density. Besides, the lateral surface of the minute rectangular slider 33 is illuminated with the light beams without any futility, and the reflected light beams can be taken out at a high efficiency. Further, it is feasible to obtain the interference distance measuring signal exhibiting a high S/N ratio and to record the servo track signal at a high density with a high stability.

Moreover, the optical path is deflected in combination with the diffraction and the refraction, which might facilitate assembling and adjusting the optical non-contact distance sensor unit 36 itself because of almost no deviation of the illuminating position upon the lateral surface of the slider 33 even when the position of the light beams shifts crosswise to a great extent within the optical probe 35. Furthermore, it is possible to avoid such a problem that if a position of the light beam incident upon a simple 45-degrees prism shifts crosswise, the reflected light beams also deviate crosswise, and, in the case of separately incorporating a cylindrical lens, a linear illuminating position is easy to largely shift in a case in which a fitting position thereof minutely shifts, with the result that the adjustment of the optical path is extremely subtle and difficult as well for guiding the light beams to a very limited space on the hard disk D.

Figure 4:
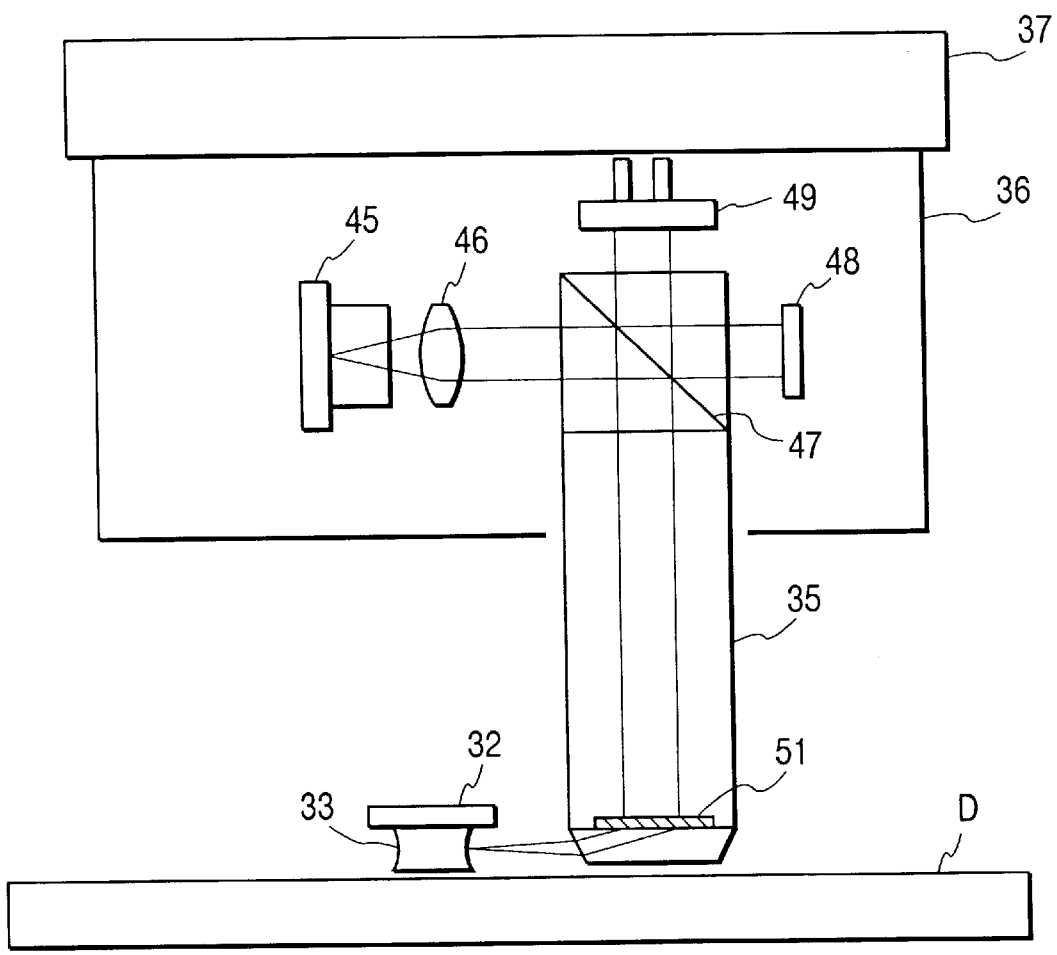
FIG. 4 is a view illustrating a construction of an optical non-contact distance sensor unit in a second embodiment.
Figure 5:
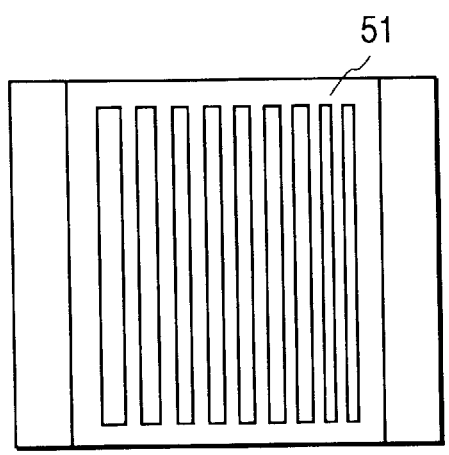
FIG. 5 is a plan view showing a linear diffraction lens.

FIG. 4 is a view illustrating a construction of a second embodiment, wherein a linear diffraction lens 51 shown in FIG. 5, which serves as an optical element exhibiting an operation of a cylindrical lens, is used in the optical non-contact distance sensor unit 36. This linear diffraction lens 51 has a grating pitch slightly longer than the wavelength λ (μm) in the material of the coherent light source 45, wherein the pitch continuouly changes to form a pattern.

The light beams pass through inside the optical probe 35 incorporating the linear diffraction lens 51. The light beams then go out from the optical non-contact distance sensor unit 36 and travel substantially parallel to the hard disk D, thus linearly illuminating the lateral surface of the magnetic head arm 32 or of the slider 33. The light beams reflected therefrom travel back to the optical non-contact distance sensor unit 36 and are detected by the light receiving element 49.

The substantially parallel beams of light outgoing from the beam splitter 47 pass through inside the optical probe 35 and travel toward the surface of the hard disk D. The light beams are then diffracted by the linear diffraction lens 51 and deflected in the optical path by an angle of substantially 90 degrees. The thus deflected light beams are at the same time converged in a wedge-like shape and travel in the crosswise direction. Then, the light beams are refracted by an obliquely cut-off tapered surface at an outgoing end of the optical probe 35, and travel in the space approximately 200 μm above from the surface of the hard disk D as well as being completely parallel to the surface of the hard disk D. Then, these light beams linearly illuminate the lateral surface of the slider 33 existing in the space above the hard disk D, and travel back along the previous optical path after being reflected therefrom.

The lateral surface of the slider 33 tends to assume a shape of a cylindrical surface when working an outer configuration thereof. However, the position of the slider 33 is thus illuminated linearly with the illumination light beams in the non-contact manner, and hence, a stable measurement can be conducted based on the light interference principle even when the lateral surface is not a complete plane, but is a cylindrical surface. The servo track signal on the hard disk D can be thereby recorded with a high stability.

Further, deflection of the optical path by a combination of diffraction and refraction and convergence of light beams in a wedged shape manner are simultaneously performed by the linear diffraction lens 51, so that the apparatus can be downsized and any cylindrical lens does not need to be respectively disposed. Optionally, even when the position of an incident light beam is displaced in a somewhat crosswise direction, the position of linear illumination onto the lateral surface of the slider 33 is hardly displaced, so that adjustment of assembly of the optical non-contact distance sensor unit 36 itself becomes easy.

Further, in the case of combining a 45-degrees prism mirror with the cylindrical lens, it follows that the light beams pass through a marginal area of the 45-degrees prism mirror. Consequently, there arises a necessity for manufacturing the 45-degrees prism mirror to have some allowance enough not to cause an eclipse of the light beams, and, as a result, it follows that the marginal area of the 45-degrees prism mirror becomes very close to the surface of the hard disk D. With the deflection in the optical path by a combination with diffraction and refraction, however, a lower surface of the optical probe 35 can be formed in a substantially rectangular shape so as to be parallel to the surface of the hard disk D, and hence, there is no possibility to cause the eclipse of the light beams. Then, the refracting surface of the outgoing portion of the optical probe 35 can be set to a maximum limit in size. Accordingly, the distance between the lower surface of the optical probe 35 and the surface of the hard disk D can be set as sufficient as 100 μm, and the optical probe 35 can be inserted safely without being jeopardized by collision.

In the embodiment discussed above, a Michelson interferometer constructed by use of the prism-like beam splitter 47 measures a distance with the high resolution. Other interferometers, e.g., a Mach-Zehnder interferometer, etc., may, however, also be employed.

Figure 6:
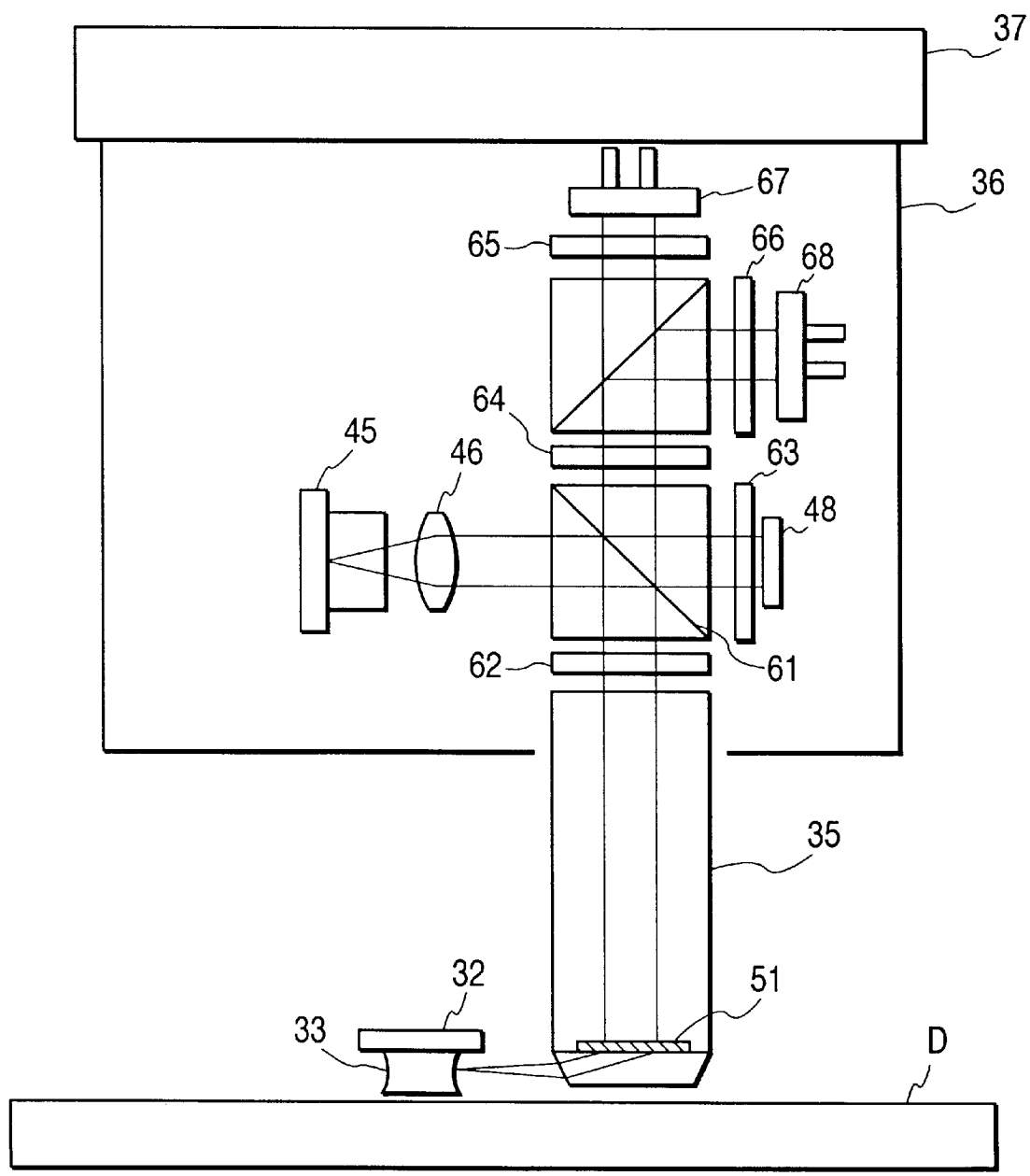
FIG. 6 is a view illustrating a construction of an optical non-contact distance sensor unit in a third embodiment.

FIG. 6 is a view showing a construction of a third embodiment. As for a variation in the level of the electric signal assuming the sinusoidal waveform that is outputted from the optical non-contact distance sensor unit 36, if there is a 2-phase 90-degrees phase difference brightness signal, a known electrical interpolation circuit is capable of dividing one sine wave into 10 to 100 phases at a high accuracy, and a change in distance can be, therefore, detected with a resolution on the order of 0.001 μm. For generating this 2-phase 90-degrees phase difference brightness signal, the optical non-contact distance sensor unit 36 is constructed of a polarizing beam splitter 61, three pieces of ¼ (λ) wavelength plates 62, 63, 64, two pieces of polarizing plates 65, 66, and two pieces of light receiving elements 67, 68.

The divergent beams of light from the coherent light source 45 are substantially collimated by the collimator lens 46, and S-polarized light beams are reflected by the polarizing beam splitter 61 and travel toward the lateral surface of the slider 33 after further penetrating the ¼ (λ) wavelength plate 62 and the optical probe 35. The light beams reflected from the lateral surface of the slider 33 return along the previous optical path and again penetrate the ¼ (λ) wavelength plate 62, thus traveling back to the polarizing beam splitter 61. On the other hand, P-polarized light beams penetrating the polarizing beam splitter 61 pass through the ¼ (λ) wavelength plate 63 and are reflected by the fixed mirror 48. The reflected light beams again transmit through the ¼ (λ) wavelength plate 63 and then return to the polarizing beam splitter 61.

Two light beams returned to the polarizing beam splitter 61 pass through the ¼ (λ) wavelength plates 62, 63 in reciprocation, and, therefore, a polarization plane of each light beam rotates by 90 degrees. Namely, the light beams reflected first as the S-polarized light from the polarizing beam splitter 61 become next the P-polarized light beams and pass through the polarizing beam splitter 61. The light beams passing first as the P-polarized light through the polarizing beam splitter 61 become next the S-polarized light and are reflected by the polarizing beam splitter 61. These two light beams, with their polarization planes orthogonal and overlapped with each other, go out from the polarizing beam splitter 61. Then, these light beams pass through the ¼ (λ) wavelength plate 64 and are thereby converted into a single rectilinear polarized light beam.

A direction of the polarization plane of this rectilinear polarization is related to a phase difference between wave surfaces of the previous two light beams, and every time the phase shifts by 2π, the polarization plane of the rectilinear polarization is rotated by 180 degrees. Accordingly, after having been split into the two rectilinear polarized light beams by the polarizing beam splitter 61, one of the light beams pass through the 45-degrees azimuthal polarizing plate 65, while the other one of the light beams travel through a 0-degree azimuthal polarizing plate 66, thereby generating 2-phase signal interference light beams in which sinusoidal brightness variation timings deviate 90 degrees from each other. Then, these light beams are received by the separate light receiving elements 67, 68, whereby the 2-phase signals having a 90-degrees phase difference are generated.

Note that a signal contrast S/N ratio becomes higher as an optical amount of the two light beams gets more of a balance, and that the number of divisions by the electrical interpolation can be increased with the higher S/N ratio, thereby improving the resolution for measuring the distance. Accordingly, it is feasible to adjust the balance between the light quantities of the two light beams into which the polarizing beam splitter 61 splits the light, by rotationally adjusting the direction of the polarization of the rectilinear polarized light beams to be at first incident upon the polarizing beam splitter 61 in accordance with reflectivity on the lateral surface of the slider 33, i.e., by rotationally adjusting the body about the optical axis on the assumption of being a semiconductor laser light source as well as being feasible to compensate for a low reflectivity on the lateral surface of the slider 33.

Figure 7:
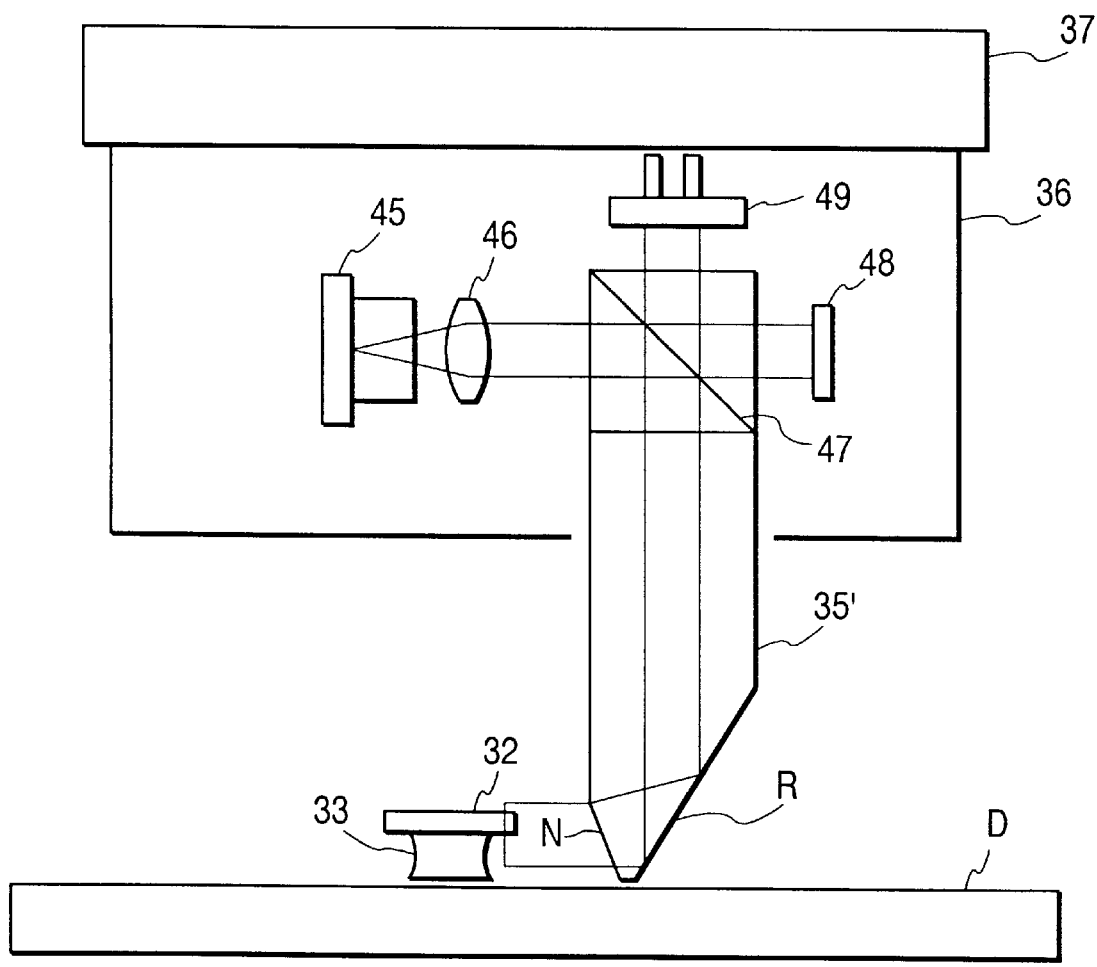
FIG. 7 is a view showing a construction of an optical non-contact distance sensor unit in a fourth embodiment.

FIG. 7 is a view illustrating a construction of a fourth embodiment. An optical probe 35' containing a reflecting surface R and refracting surface N that have an incident angle of approximately 60 degrees at an outgoing portion is used instead of the optical probe 35 consisting of the diffraction grating 50 and the refracting surface as shown in FIGS. 2A and 2B.

The substantially parallel light beams outgoing from the beam splitter 61 pass through inside the optical probe 35' and travel toward the surface of the hard disk D. The light beams reflected by the reflecting surface R are thus deflected in the optical path at approximately 120 degrees and travel crosswise downward. The light beams are then refracted by the obliquely cut-off tapered surface at the outgoing end of the optical probe 35', and travel in the space approximately 200 μm above from the surface of the hard disk D as well as being completely parallel to the surface of the hard disk D. Then, these light beams illuminate the lateral surface of the slider 33 existing in the space above the hard disk D. The light beams reflected by the lateral surface of the slider 33 again travel back along the previous optical path.

In accordance with the fourth embodiment, the servo track signal can be recorded at the high density with the high stability as in the first embodiment. Further, the deflection in the optical path is performed in a combination of reflection and refraction, and it is, therefore, possible to manufacture the optical probe 35' by such working as to cut it out of a glass rod, which facilitates manufacturing the optical non-contact distance sensor unit 36 itself. Furthermore, the light beams may pass through an area in the vicinity of the center of the optical probe 35'. Hence, an adjustment of the optical axis can be simply effected, and the optical non-contact distance sensor unit 36 can be easier to assemble.

Further, the end portion of the optical probe 35' is an angular portion containing two surfaces having an angle of approximately 90 degrees, and hence, there must be a necessity for making the light beams come in and out of the edge of the prism in the case of a simple 45-degrees prism. If a position of the light beam shifts crosswise, vignetting is easy to occur. Further, when using the simple 45-degrees prism mirror, the light beams pass through a marginal area of the 45-degrees prism mirror. Consequently, there arises a necessity for manufacturing the 45-degrees prism mirror to have some allowance enough not to cause an eclipse of the light beams, and therefore, it follows that the marginal area of the 45-degrees prism mirror becomes very close to the surface of the hard disk D. In the fourth embodiment, however, there might be no possibility of causing the eclipse of the light beams, so that the refracting surface of the outgoing portion of the optical probe 35' can be set to a maximum limit in size. Accordingly, the distance between the lower surface of the optical probe 35' and the surface of the hard disk D can be set as sufficient as 100 μm, and the optical probe 35' can be inserted safely without being jeopardized by collision.

Figure 8:
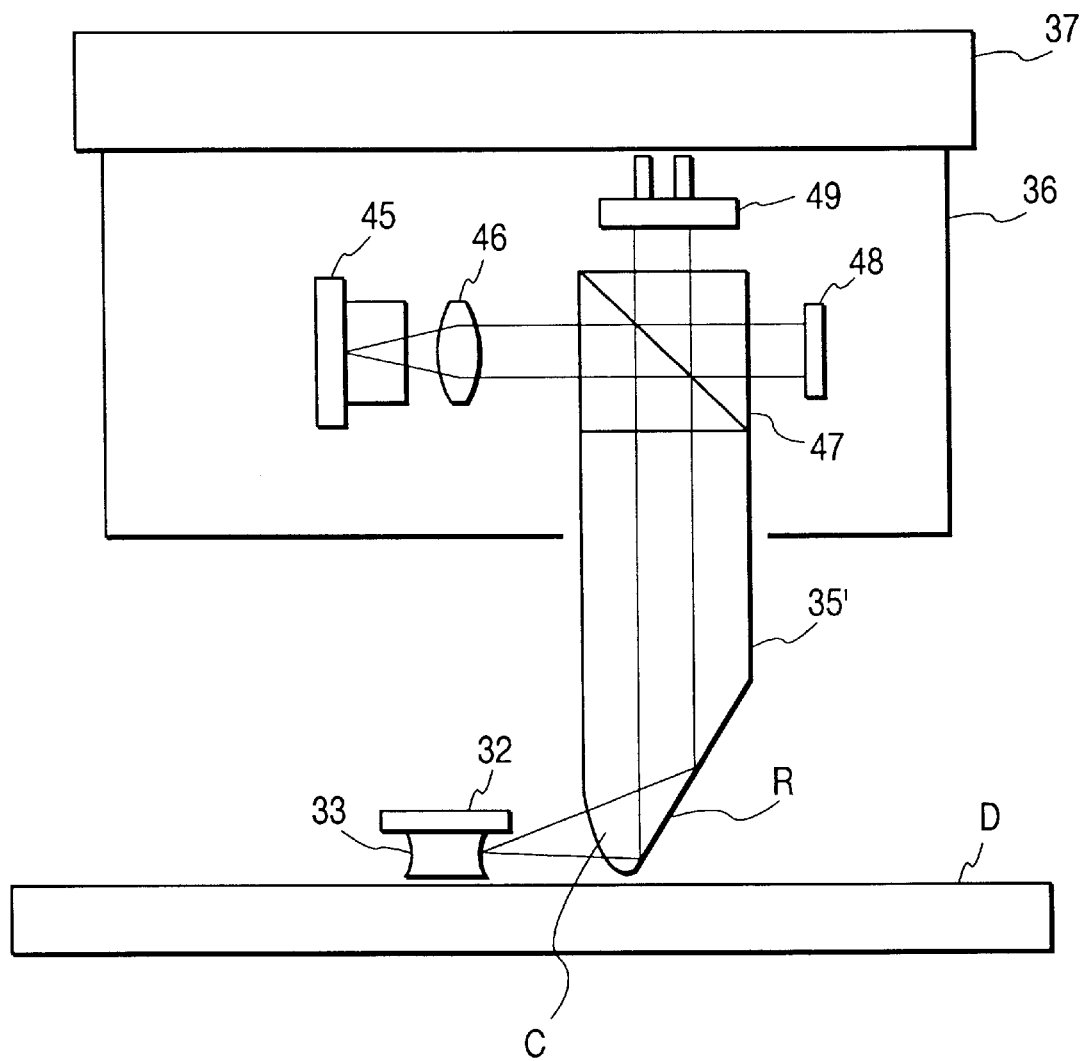
FIG. 8 is a view illustrating a construction of an optical non-contact distance sensor unit in a fifth embodiment.

FIG. 8 is a view showing a construction of a fifth embodiment. In the optical probe 35' in the fifth embodiment, the refracting surface N in the fourth embodiment is changed in shape, and a cylindrical surface-like refracting lens surface C having an operation of the cylindrical lens is used, whereby the lateral surface of the slider 33 is illuminated linearly with the light beams.

The substantially parallel beams of light outgoing from the beam splitter 47 pass through inside the optical probe 35' and travel toward the surface of the hard disk D. The parallel light beams are then reflected by the reflecting surface R having an incident angle of approximately 60 degrees, deflected in the optical path by approximately 120 degrees and thus travel crosswise and downward. The light beams are refracted by the cylindrical surface-like refracting surface C at the outgoing end of the optical probe 35' and, while converging in a wedge-like configuration, travel in the space approximately 200 μm above from the surface of the hard disk D as well as being completely parallel to the surface of the hard disk D. Then, these light beams linearly illuminate the lateral surface of the slider 33 existing in the space above the hard disk D. The light beams reflected therefrom travel back along the previous optical path.

In the fifth embodiment also, the position of the slide 33 is illuminated with the linear illumination light beams in the non-contact manner, and hence, even when the lateral surface of the slider 33 is not a complete flat surface but a cylindrical surface, it is possible to implement stable measurement by making use of the light interference principle and to record more stably the servo track signal on the hard disk D. Furthermore, the lateral surface of the slider 33 may be formed as the cylindrical surface when in the working process for the external shape, which may, therefore, make the working easier.

Moreover, there are simultaneously effected the deflection in the optical path in the combination of reflection and refraction, and also, the wedge-like convergence of the light beams on the refracting lens surface C. Hence, down-sizing is possible, and the cylindrical lens is not required to be disposed otherwise. Moreover, even if the position of the light beams within the optical probe 35' shifts to some extent, there might be almost no deviation in position of the linear illumination upon the lateral surface of the slider 33. Consequently, the optical non-contact distance sensor unit 36 itself becomes easier to assemble and adjust.

Further, the end portion of the optical probe 35' has the angular portion containing the two surfaces having an angle of substantially 90 degrees, and hence, if illuminated with the wedge-like converging light beams by combining the 45-degrees mirror with the cylindrical lens, the light beams passing through the 45-degrees prism mirror have a larger width, with the result that the light beams pass through the very marginal area to the utmost. If arranged so as not to cause the eclipse of the light beams, the marginal area of the 45-degrees prism mirror gets very proximal to the surface of the hard disk D. In the fifth embodiment, however, the refracting lens surface C of the optical probe 35' can be formed to the maximum limit in size, and, therefore, the distance between the lower surface of the optical probe 35' and the surface of the hard disk D can be set as sufficient as 100 μm. Then, the optical probe 35' can be inserted safely without being jeopardized by a collision. Note that the cylindrical surface-like reflecting surface having the operation of the cylindrical lens may be used in place of the reflecting surface R.

Figure 9:
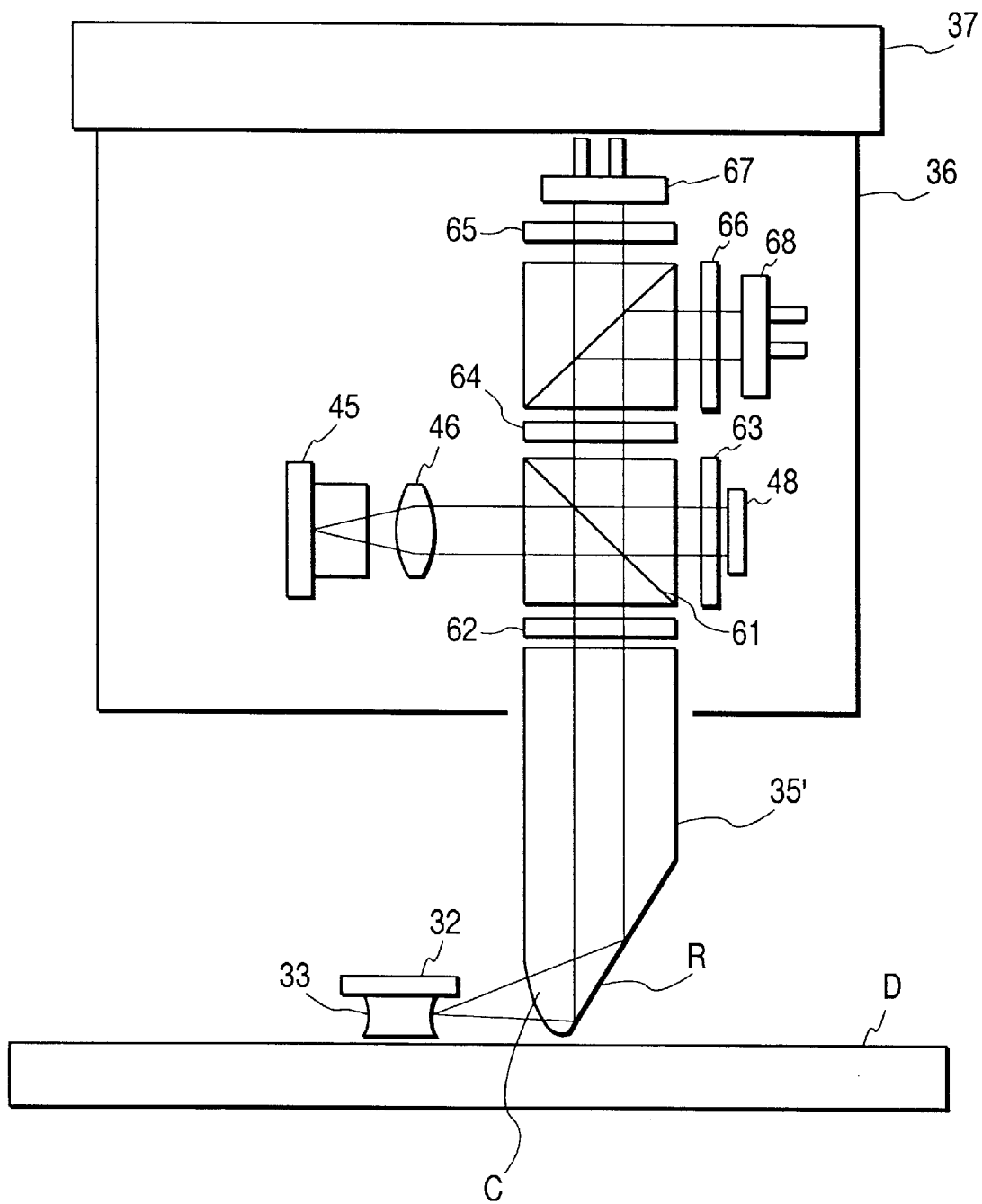
FIG. 9 is a view showing a construction of an optical non-contact distance sensor unit in a sixth embodiment.

FIG. 9 is a view illustrating a construction of a sixth embodiment using the optical non-contact distance sensor unit 36 shown in FIG. 6 and the optical probe 35' containing the reflecting surface R and the refracting lens surface C shown in FIG. 8, wherein the same operation and effect as those in the third embodiment are shown.

As discussed above, the interference system is provided with the light beam deflecting member for guiding the measuring light beams to the lateral surface portion of the magnetic head arm or the lateral surface portion of the slider, and the positioning process for the magnetic head with respect to the hard disk is executed based on the relative displacement data of the magnetic head arm as well as on the reference light. The precise micro positioning process for the magnetic head arm can be thereby implemented indirectly in the non-contact manner, and hence, it is feasible to obtain the high-density, high-stability and small-sized servo track signal writing apparatus by recording the servo track signal on the hard disk repeatedly at every stop.

It is apparent that, in this invention, a wide range of different working modes can be formed based on the invention without deviating from the spirit and scope of the invention. This invention is not restricted by its specific working modes except being limited by the appended claims.

What is claimed is:

1. An apparatus for recording information on a hard disk with a magnetic head arm provided in a hard disk drive, said apparatus comprising:

an interference measuring system, including an outgoing portion for a measuring light beam to said arm and a reference light forming portion, for obtaining relative displacement information with respect to said arm by interfering the reference light with reflected light of the measuring light from said arm or a slider belonging to said arm, said interference measuring system having a light beam deflecting member for deflecting the measuring light and thus guiding the measuring light to a lateral surface of said arm or a lateral portion of said slider;

a control system for generating a signal for positioning said arm with respect to said hard disk on the basis of the relative displacement information obtained by said interference measuring system; and a signal system for transmitting a signal for recording information on said hard disk to said magnetic head.

2. The apparatus according to claim 1, further comprising:

a position control system for controlling operation to fix a relative positional relationship between said arm and said interference measuring system on the basis of the relative displacement information; and a rotation control system for controlling a rotational position of said arm member for controlling a relative position of said arm to said hard disk.

3. An apparatus for recording information on a hard disk with a magnetic head arm provided in a hard disk drive, said apparatus comprising:

a rotary body disposed to rotate about a shaft substantially coaxial with a center of rotation of said arm;

an optical non-contact type distance sensor unit, provided on said rotary body, for measuring a displacement from a lateral portion of said arm or a lateral portion of a slider belonging to said arm, said sensor unit being constructed by an interference distance measuring portion having a coherent light source, a beam splitter and a light receiving portion, and by an optical probe having a diffraction grating and a refracting surface;

a control system for moving said arm so as to offset the displacement measured by said sensor unit and controlling a movement of said arm, which is accompanied by rotational positioning of said rotary body with respect to said rotary body, to thereby effect positioning of said arm or said slider; and a signal system for causing said magnetic head to execute a writing process of a servo track signal onto said hard disk during a sequential positioning process for said arm or said slider.

4. The apparatus according to claim 3, wherein said interference distance measuring portion splits the light beam from said light source into two beams by said beam splitter, synthesizes and interferes the reflected light from the lateral portion when the lateral surface of said arm or the lateral portion of said slider is irradiated with the light with the other beam by said beam splitter, and receives an interference signal by said light receiving portion.

5. The apparatus according to claim 3, wherein said diffraction grating deflects the light beam by an angle of substantially 90 degrees, said refracting surface deflects the light beam smaller than by said diffraction grating, in cooperation with said diffraction grating and said refracting surface, an optical path is deflected substantially parallel to the surface of said hard disk, and a sectional configuration of the light beam is changed to an elongate elliptical shape or a rectangular shape.

6. The apparatus according to claim 3, wherein said diffraction grating is a diffraction grating lens for deflecting the light beam by an angle of substantially 90 degrees and converging the light beam in a wedge-like shape, and said refracting surface deflects the light beam smaller than by said diffraction grating, in cooperation with said diffraction grating and said refracting surface, an optical path is deflected substantially parallel to the surface of said hard disk, and a sectional configuration of the light beam is changed to a rectangular shape or a linear shape.

7. The apparatus according to claim 3, wherein said light receiving portion has two light receiving elements, and obtains period signals with phases different from each other from said respective light receiving elements.

8. An apparatus for recording information on a hard disk with a magnetic head arm provided in a hard disk drive, said apparatus comprising:

a rotary body so disposed as to rotate about a shaft substantially coaxial with a center of rotation of said arm;

an optical non-contact type distance sensor unit, provided on said rotary body, for measuring a displacement from a lateral surface of said arm or of a slider belonging to said arm, said sensor unit being constructed by an interference distance measuring portion having a coherent light source, a beam splitter and a light receiving portion, and by an optical probe portion having a reflecting surface and a refracting surface;

a control system for moving said arm to offset the displacement measured by said sensor unit and controlling movement of said arm, which is accompanied by rotational positioning of said rotary body to thereby effect positioning of said arm or said slider; and a signal system for causing said magnetic head to execute a writing process of a servo track signal onto said hard disk during a sequential positioning process for said arm or said slider.

9. The apparatus according to claim 8, wherein said interference distance measuring portion splits the light beam from said light source into beams of light by said beam splitter, synthesizes and interferes the reflected light from the lateral surface when the lateral surface of said arm or of said slider is irradiated with the light with the other beam of light by said beam splitter, and receives an interference signal by said light receiving portion.

10. The apparatus according to claim 8, wherein said reflecting surface deflects the light beam, said refracting surface deflects the light beam smaller than by said reflecting surface, in cooperation with said reflecting surface and said refracting surface, an optical path is deflected substantially parallel to the surface of said hard disk, and a sectional configuration of the light beam is changed to an elongate elliptical shape or a rectangular shape.

11. The apparatus according to claim 8, wherein the optical path is deflected substantially parallel to the surface of said hard disk in cooperation with said reflecting surface and said refracting surface, and at least one of said reflecting surface and said refracting surface takes a cylindrical surface-like shape.

12. The apparatus according to claim 8, wherein said light receiving portion has two light receiving elements and obtains period signals with phases different from each other from said light receiving elements.

* * * * *